Feb. 11, 1969  R. G. FERRIS  3,426,924
SILO AND UNLOADER
Filed Nov. 17, 1966
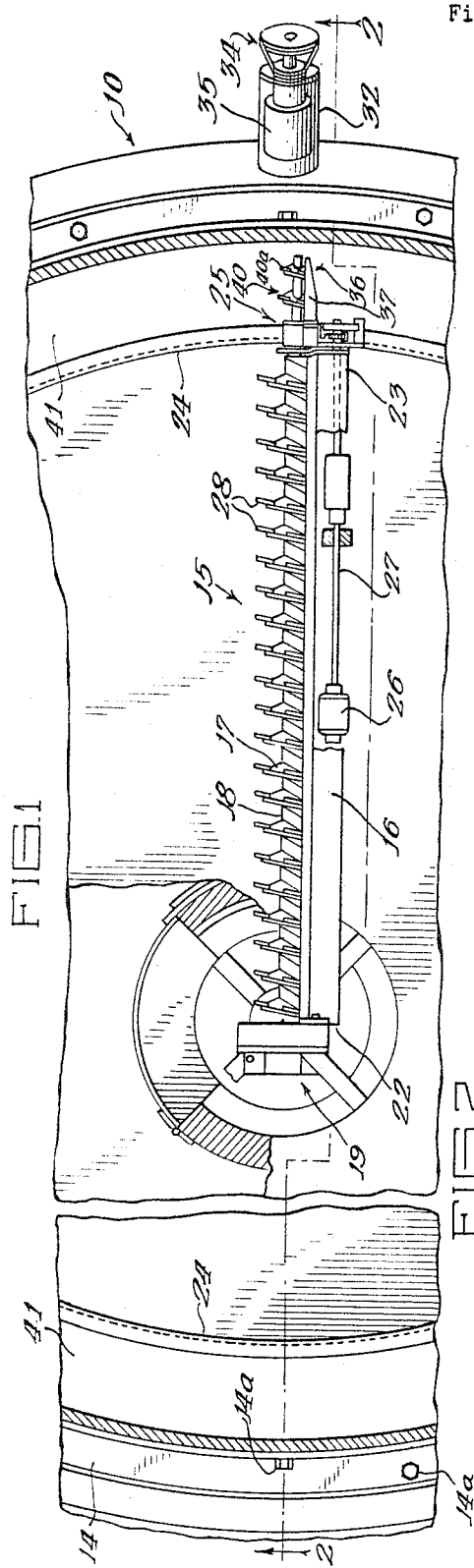
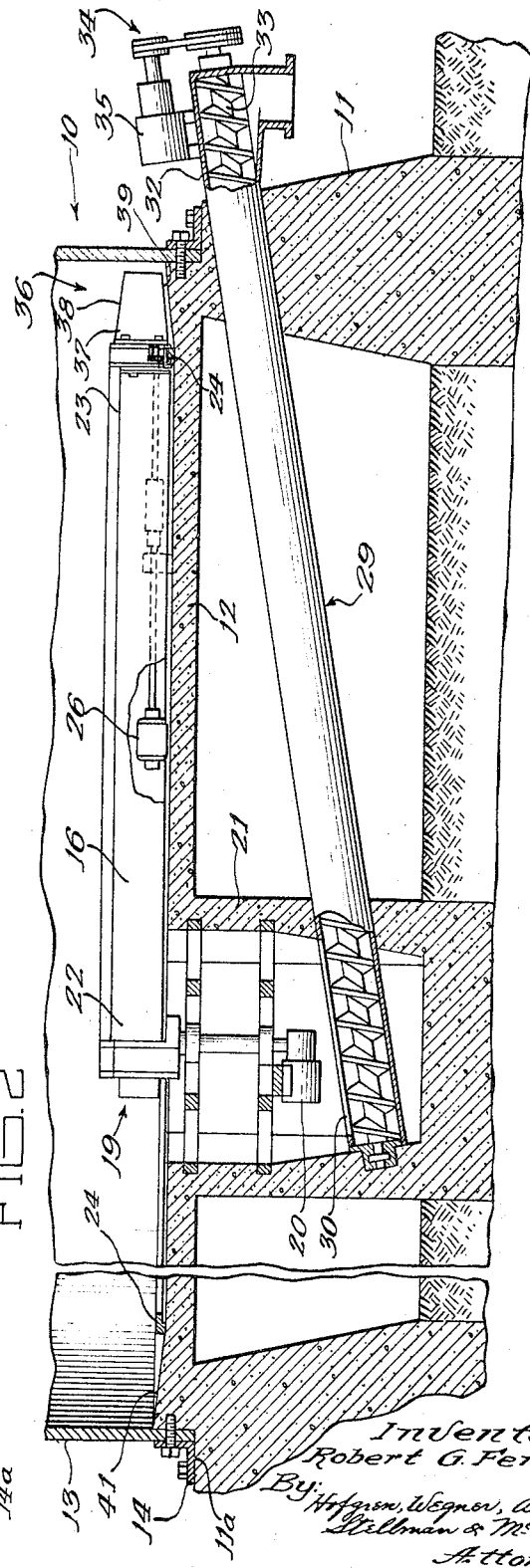
Inventor:
Robert G. Ferris
By Hofgren, Wegner, Allen,
Stellman & McCord
Attorneys United States Patent Office 3,426,924
Patented Feb. 11, 1969

3,426,924
SILO AND UNLOADER
Robert G. Ferris, Harvard, Ill., assignor to
Starline, Inc., a corporation of Illinois
Filed Nov. 17, 1966, Ser. No. 595,138
U.S. Cl. 214—17                                  6 Claims
Int. Cl. B65g 65/30

ABSTRACT OF THE DISCLOSURE

A silo structure having a bottom silage unloading device therein, characterized by the fact that the silo has a horizontal floor and that, in order to reduce stresses imparted to the silo wall by stored material, the floor has a peripheral portion extending radially inwardly from the wall for a distance of about two feet which is inclined upwardly toward the wall at an angle of inclination in the range of about 10 degrees to 25 degrees. A bottom silo unloader is mounted immediately above the floor and generally parallel thereto, and includes a sweep arm and conveyor means which rotates about the vertical axis of the silo and has its outer end portion overlying the inclined peripheral floor portion.

---

It was known, at least as early as June 1949, when the application which became Tiedemann Patent 2,635,770 was filed, that in a silo, or similar storage vessel, the material adjacent the junction between the wall and floor of the silo becomes compacted to a higher density than is the rest of the material. A bottom silo unloader of the general type disclosed in the Tiedemann patent or in Laidig Reissue Patent 25,863, has its outer end spaced a short distance from the silo wall so as not to contact the wall as it rotates; and such an unloader creates two problems.

In the first place, as it operates, it necessarily leaves a thin wall of material against the silo wall, with a void in the bottom of the silo and an arched or bridged condition in which the mass of material above the void is supported by the thin wall of material and by the lower portion of the silo wall. This produces severe radial stresses on the lower part of the wall and longitudinal stresses on the floor adjacent the wall.

In the second place, when the unloader is first operated its outer end portion extends into the compacted material near the wall, and power requirements are undesirably high.

Heretofore, it has been proposed to alleviate the second problem (without solving it) by providing a primary sweep arm the outer end of which is far enough from the silo wall to avoid the highly compacted material, so that the unloader may be initially operated to remove only the material in the central portion of the silo. A cutting and conveying extension is then placed on the sweep arm, and the sweep arm with the extension is rotated to substantially entirely remove the compacted material adjacent the silo wall. The sweep arm extension passes close enough to the silo wall that the small amount of material near the wall is unable to support the remaining material in the silo and the central dome of material above the sweep arm tends to collapse, whereupon the material can be removed by the conveyor means on the sweep arm. While this mode of operation enables material to be effectively removed from the silo, it does not relieve the severe stresses imparted to the lower portion of the silo wall. Moreover, even when the material is not bridged or arched within the silo, a residual lateral force is applied to the silo wall which tends to bulge it.

The problem of wall stress has been alleviated by providing a heavy gauge wall sheet at the lower portion of a steel silo wall, or to provide heavy reinforcing within the wall of a concrete silo. Furthermore, with a steel silo, it has been found necessary to utilize a series of vertical stiffening members to reinforce the heavy gauge wall sheet. These expedients have been successful in resisting the stresses imparted to the lower portion of the silo wall, but it is readily apparent that they are extremely costly and do not eliminate the problem itself.

It has been recently proposed to provide a sweep arm as described in the preceding paragraph with conveying means on the auxiliary sweep arm extension member of smaller diameter than the conveying means on the main sweep arm, with the auxiliary sweep arm conveying means preferably being tapered. This arrangement has been found to improve the efficiency of the cutting of the compacted material adjacent the silo wall, and such an arrangement is disclosed and claimed in Laidig patent application Ser. No. 561,832, filed June 30, 1966. The principal object of the present invention is to provide an even further improvement over the arrangement disclosed in said Laidig patent application.

An object of the invention is to provide a silo structure which reduces the stresses imparted to the silo wall without materially increasing the cost of the silo.

Another object of the invention is to provide a silo construction, which, when a bottom silo unloader is operated therein, will minimize the stresses imparted to the silo wall.

A further object of the invention is to provide a silo with an inclined floor portion adjacent the silo wall that cooperates with a tapered end of an unloader sweep arm having tapered cutting and conveying means thereon to reduce the stresses applied to the silo wall and to improve the efficiency of the cutting of the material adjacent the silo wall.

These and other objects of the invention will hereinafter become more fully apparent from the following description, taken in connection with the annexed drawings, wherein:

FIG. 1 is a fragmentary, broken top plan view of a silo embodying the principles of the present invention; and FIG. 2 is a cross sectional view taken generally along line 2—2 of FIG. 1.

While this invention is susceptible of embodiment in many different forms, there is shown in the drawings and will herein be described in detail an embodiment of the invention with the understanding that the present disclosure is to be considered as an exemplification of the principles of the invention and is not intended to limit the invention to the embodiment illustrated. The scope of the invention will be pointed out in the appended claims.

Referring to the drawings in greater detail, a silo, indicated generally at 10 has a base or foundation 11 which supports a generally circular horizontal floor 12. A cylindrical wall 13 extends upwardly at the periphery of floor 12, and in the illustrated embodiment wall 13 is a steel member resting on a shoulder 11a of base 11 outwardly of floor 12. An annular angle member 14 embraces the base of wall 13, and bolts 14a secure the channel legs and the wall 13 to the silo foundation. It should be understood, that although the improvement to be hereafter described is illustrated in connection with a steel silo it could also be embodied in a monolithic concrete or concrete block silo, if desired.

An unloader, indicated generally at 15, is of the same general construction as that disclosed in the above mentioned Laidig application, and reference may be made to this application for a more complete explanation of the details not specifically explained herein. Unloader 15 includes a sweep arm 16 having a primary auger conveyor 17 thereon which includes a shaft 18 that is rotated by motor 20 through drive means 19. Motor 20 and drive means 19 are mounted generally axially of a central well 21 in floor 12, and the sweep arm 16 has an inner end 22 positioned over well 21, with sweep arm end 22 mounted for rotation about the axis of the silo. The outer free end 23 of the sweep arm 16 terminates adjacent a circular track 24 that is spaced inwardly from the inner periphery of the wall 13, and sweep arm end 23 is mounted in a carriage 25 which is driven around track 24 by drive means including a motor 26 and shaft 27 rotated thereby. Knives 28 are provided on the auger 17, so that as the auger shaft 18 is rotated by motor 22 and drive means 19 and the sweep arm is rotated by motor 26, the knives 28 on the auger 17 cut off material within the silo, which is then conveyed by the auger radially inwardly of the silo into well 21. A further auger conveyor 29 has an inner end 30 that communicates with well 21 and an outer end 32 that is positioned outwardly of the silo base 11, and the shaft 33 of conveyor 29 is rotated through drive means 34 by motor 35.

An auxiliary conveyor means 36 is provided at the outer end of the unloader, and includes a sweep arm extension member 37 that is removably mounted upon sweep arm 36. The upper and lower edges 38 and 39 of extension member 37 converge outwardly toward one another and member 37 is preferably curved laterally between edges 38 and 39. As is explained in the above mentioned Laidig application, an auxiliary auger 40 is removably connected to primary auger shaft 18 and rotates within extension member 37. Knives 40a are provided on the flighting of auger 40, which is uniformly tapered toward its outer end to enhance its ability to efficiently cut through the hard packed material adjacent the silo wall 13.

As is evident from FIG. 2, the portion of floor 12 outwardly of track 24 is inclined upwardly as shown at 41, and thus effectively defines a frusto-conically shaped floor portion having an axis that is substantially coincident with the axis of the silo. Floor portion 41 is preferably inclined at the same angle as the lower edge 39 of extension member 37, so that the entire lower edge of the sweep arm, including the extension, will be substantially parallel with the floor portion adjacent thereto. An inclination in the range of 10°–25° has been found to be particularly advantageous for the purposes of the invention, although it will be recognized that substantially larger angles could be provided. While floor portion 41 and extension member 37 are shown inclined, the present invention contemplates that these cooperating elements could be curved to provide spherical or parabolic surfaces, and the use of the word "inclined" in the specification and claims is intended to be inclusive of curved as well as strictly inclined surfaces.

The auxliary auger 40 may be constructed in different pitches and different lengths, and with differing degrees of taper, to accommodate the operation of the silo unloader with different types of material and other variable conditions within the silos such as the moisture content of the silage. Moisture content of material in a silo may vary from the bottom to the top of the silo; likewise, when a silo filled with one type of material has been partly emptied, different material may be loaded into the top of the silo. For these reasons it is desirable for the auxiliary auger 40 to be readily removable and replaceable while the silo is in use. This may be accomplished by providing a closure (not shown) in the silo wall at floor level, so that when it becomes necessary to change the auxiliary auger for any reason the closure may be removed, the thin wall of packed material which covers the opening in the silo wall may be manually removed, and the silo unloader rotated until it is aligned with the opening in the silo wall. The auxiliary auger 40 may then be removed through the opening and another auxiliary auger of different characteristics, better suited to the particular conditions in the silo at that point in the unloading process, may be substituted for the auxiliary auger originally used.

Further, the auxiliary auger may have an arcuate surface of revolution, or may be stepped rather than frusto-conical, and all such variations are intended to be included in the generic term "tapered".

When the silo unloader is operated it creates an arch, bridge, or dome in the silage which is peripherally supported upon the thin wall of silage against the silo wall and has a substantial radially outwardly directed component of force tending to bulge the silo wall as well as a component of force which is directed vertically downwardly. The inclined floor portion 41 provides a reaction force that is generally normal to the inclined surface, so that it has a radially inwardly directed component that opposes the radially outwardly directed component of force exerted by the arched material. Accordingly, the stress upon the lower part of the silo wall is very greatly reduced, and the necessity of reinforcing the lower part of the wall is eliminated.

In addition, the inclined floor portion 41 cooperates with the tapered auger 40 to promote downward movement of material near the silo wall 13 by creating a surface along which material may slide to effectively taper the periphery of the dome of material.

Thus, it will be appreciated that each of the objects of the invention has been fully achieved.

I claim:

1. In combination: a silo having a generally horizontal floor with a central opening therein; a generally cylindrical wall extending vertically upwardly from said floor at the periphery thereof; bottom unloading means adjacent the floor of said silo including a sweep arm mounted above said floor for rotary movement in said silo, said sweep arm having conveyor means thereon closely adjacent the floor and generally parallel thereto for conveying material generally radially inwardly of said silo into said opening; means for rotating said sweep arm around the silo and for driving said conveyor means; and means adjacent the junction between said wall and said floor for reducing stresses imparted to the lower portion of said wall, said last named means being defined by a peripheral portion of said floor beneath the outer end portion of said sweep arm and conveyor means, said peripheral portion being inclined upwardly toward said wall.

2. The combination of claim 1 wherein the means for rotating the sweep arm includes a generally circular drive track on the silo floor inwardly of the silo wall, and in which said perpiheral floor portion is inclined generally uniformly upwardly substantially from said track to said wall.

3. The combination of claim 2 wherein the outer end portion of said conveyor means above the inclined floor portion is tapered toward the wall.

4. The combination of claim 3 wherein the outer end portion of the conveyor means is tapered at substantially the same angle as the angle of inclination of said peripheral floor portion.

5. The combination of claim 1 wherein said peripheral floor portion is inclined at an angle in the range 10°–25°.

6. The combination of claim 5 wherein the means for rotating the sweep arm includes a generally circular drive track on the silo floor substantially at the inner margin of said inclined floor portion, and in which the outer end portion of the conveyor means above the inclined floor portion is tapered toward the wall at substantially the same angle as the angle of inclination of said peripheral floor portion.

References Cited

UNITED STATES PATENTS

| | | | |
|---|---|---|---|
| 3,067,914 | 12/1962 | Ellaby | 214—17 X |
| 3,127,032 | 3/1964 | Roberts | 214—17 |
| 3,356,235 | 12/1967 | Laidig | 214—17 |

HUGO O. SCHULZ, *Primary Examiner.*